May 28, 1935.　　　　　D. W. MAIN　　　　　2,002,901
VEHICLE AND PILOT MEANS THEREFOR
Filed March 28, 1932　　　3 Sheets-Sheet 1
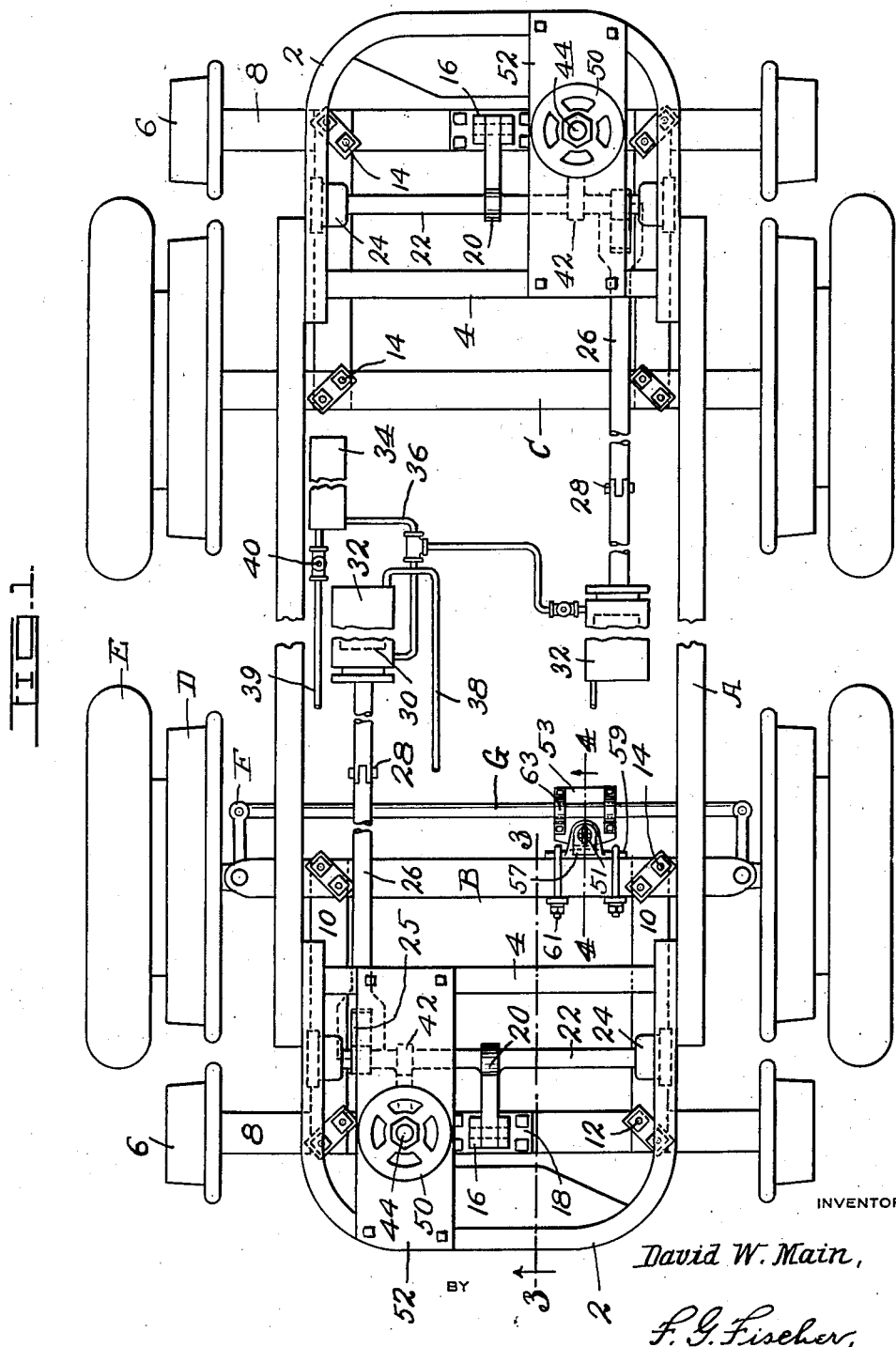
INVENTOR;
David W. Main,
BY
F. G. Fischer,
ATTORNEY,

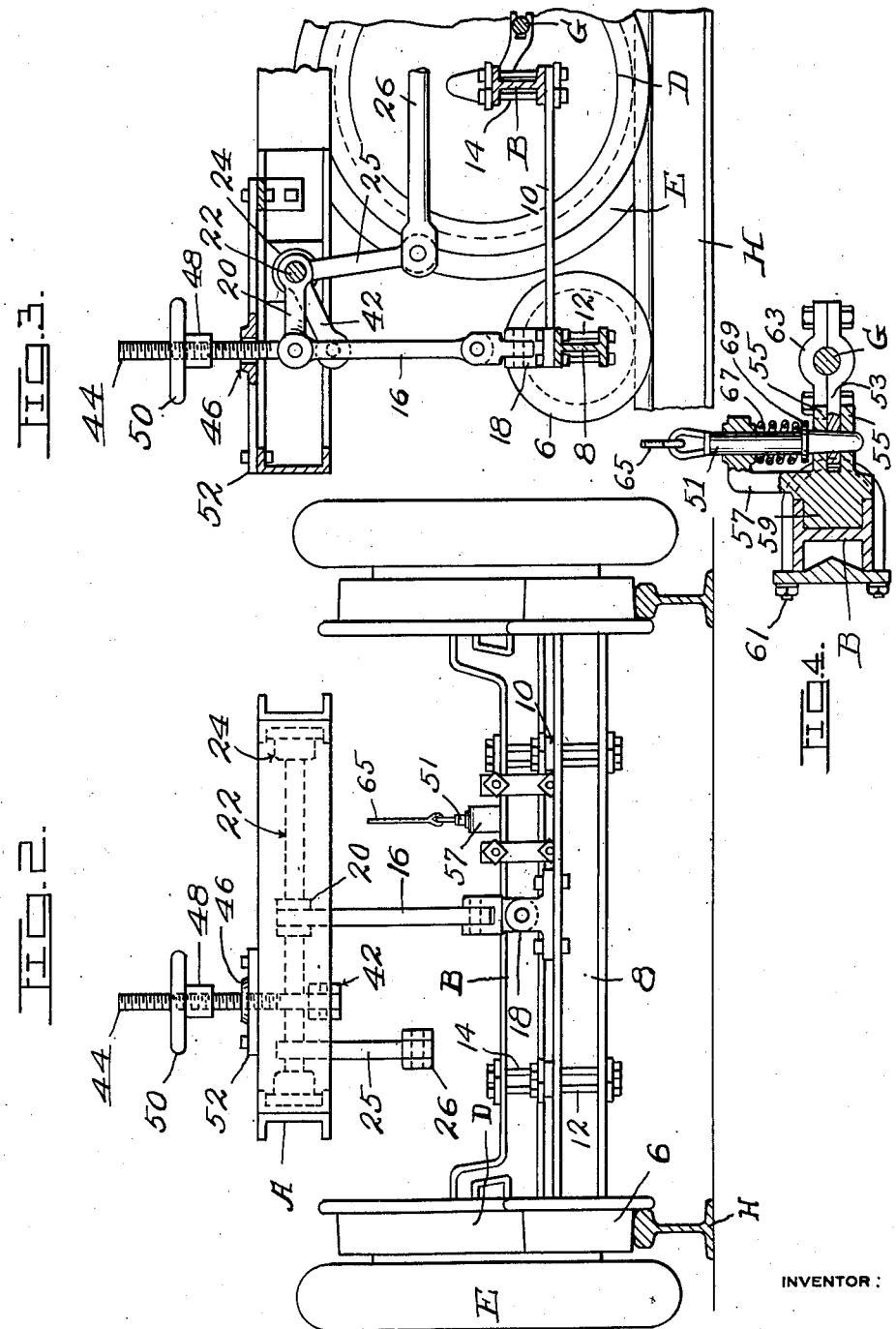

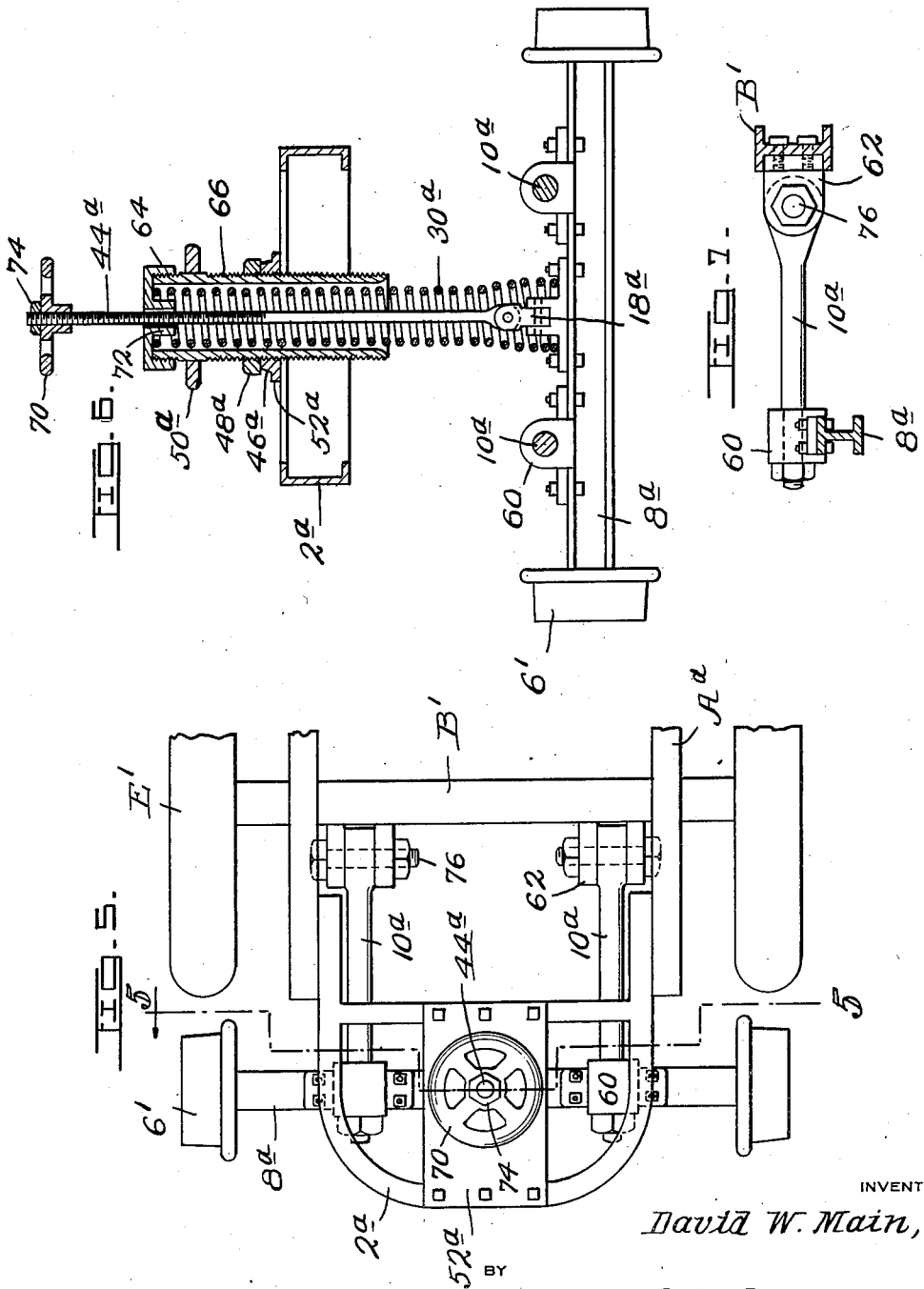

Patented May 28, 1935

2,002,901

UNITED STATES PATENT OFFICE 2,002,901

VEHICLE AND PILOT MEANS THEREFOR

David W. Main, Oklahoma City, Okla., assignor to Transportation Systems, Inc., Oklahoma City, Okla., a corporation of Oklahoma Application March 28, 1932, Serial No. 601,691

18 Claims. (Cl. 105—215)

My invention relates to improvements in passenger busses, motor trucks, trailers, etc., all of which, for the sake of brevity, will hereinafter be referred to as "the vehicle", and the present invention relates more particularly to the arrangement of the wheels whereby the vehicle is adapted to travel upon either a highway or a railway track. Such arrangement permits the vehicle to be operated on city streets for the collection of passengers or freight and then be driven upon the railway to its destination where it can be driven from the track for purposes of distribution.

Vehicles of the type adapted to both road and track use are generally equipped with wheels having rubber tires for traveling upon the road and flanged tires of less diameter for running upon the track and guiding the vehicle while on said track. As the flanged tires are of lesser diameter than the rubber tires difficulties arise when operating a vehicle with dirigible front wheels on tracks situated on paved streets, or when crossing highways, switches, railway crossings, or other surfaces on a level with the surface of the track, as in such instances the flanged tires are lifted from the track by the rubber tires and it is very difficult, even for the most capable driver, to guide the vehicle so that the flanged wheels will land squarely upon the track when the rubber tires descend from the level of the surface of the track.

The principal object of my invention is to provide a new and novel pilot means which will reliably guide the vehicle, especially during transition from track to highway and highway to track, so that the flanged vehicle wheels will land truly upon the track when returning thereto and thus eliminate all danger of derailment.

A further object is to provide pilot means for a vehicle equipped with wheels of the same gage as the track and having only rubber tires which are held upon the track by the aid of said pilot means, so that the use of the flanged vehicle tires for carrying the load and guiding the vehicle while on the track may be dispensed with.

A further object is to provide pilot means including flanged track wheels and resilient means for holding them at uniform pressure upon both rails under all operating conditions, at the same time permitting divers movements of the vehicle body while maintaining positive alinement between the respective axles and the respective wheels of said pilot means and the vehicle.

An important requisite for pilot means of this character is to hold the vehicle wheels from independent lateral movement in a horizontal plane, so that the rubber tires will be held in alinement with and follow said pilot means upon the track and thereby avoid accidental derailment. It is also important that the pilot means be sufficiently flexible to accommodate itself to such unevenness as ordinarily exists in railway tracks. It is also desirable to be able to regulate the pressure of the pilot means upon the track to prevent accidental derailment, and to provide means for raising and holding said pilot means off the track when the vehicle is ready to traverse a paved street or highway.

In carrying out my invention I have provided a pilot embodying the advantages above referred to, and in order that the invention may be fully understood reference will now be had to the accompanying drawings, in which:

Fig. 1 is a broken plan view of a vehicle equipped at each end with a pilot for guiding the vehicle when running forward or backward.

Fig. 2 is a broken front elevation of the vehicle and one of the pilots.

Fig. 3 is a broken cross section on line 3—3 of Fig. 1.

Fig. 4 is an enlarged cross section on line 4—4 of Fig. 1, showing means for locking the steering mechanism of the vehicle in a straight ahead position.

Fig. 5 is a broken plan view of the vehicle equipped with a modified form of pilot.

Fig. 6 is an irregular cross section on line 6—6 of Fig. 5.

Fig. 7 is a detail side elevation, partly in section, of some of the parts employed in carrying out the invention.

Referring in detail to the different parts, A designates the frame, B and C the front and rear axles, D the flanged tires and E the rubber tires, respectively, mounted upon the wheels of the vehicle.

If the vehicle is in the form of a passenger bus or truck instead of a trailer, it is equipped with the conventional manually controlled steering means for the front wheels. In the present instance I have deemed it necessary to only show the steering arms F and the drag link G of said steering means.

As the guide means or pilot hereinafter referred to and forming the most important feature of the present invention is of substantially the same construction whether applied to one end of the vehicle, or both ends thereof as shown by Fig. 1, for the sake of brevity only one will be described in detail. Referring more particularly to the form shown by Figs. 1 to 3, inclusive 2 designates an extension frame, preferably in the form of a yoke having its ends bolted or otherwise rigidly secured to the forward portion of the frame A and reinforced by a transverse member 4.

6 designates a pair of flanged pilot wheels arranged in alinement with the flanged tires D, so as to travel upon the rails H of the track. The wheels 6 are mounted upon the spindles of an axle 8 and preferably arranged close to the flanged tires D to avoid such undue extension of the wheel base of the vehicle as would render difficult the traversing of curved portions of the track.

The axle 8 is held in spaced relation to the axle B by means of a pair of arms 10. In order that the flanged tires D and the wheels 6 may be held in rigid alinement with each other the arms 10 are firmly secured at their front and rear ends to the axles 8 and B by suitable means such as bolts 12 and 14, respectively. While it is important that the arms 10 be sufficiently rigid to prevent independent lateral movement in a horizontal plane between the wheels 6 and the flanged tires D, it is also important that said arms 10 be flexible enough to permit the wheels 6 to accommodate themselves to any unevenness in the track, such, for instance, as where the end of one rail projects above the end of the abutting rail which would necessitate one of the wheels 6 moving to a higher plane than its companion and thus incline the axle 8 from a horizontal plane. So I prefer to have the arms 10 in the form of springs to obtain the necessary flexibility.

It is also important to provide means for regulating the pressure of the wheels 6 upon the rails H to prevent accidental derailment and also for raising and holding said wheels above the track, so that the vehicle may travel upon a highway or other surface where it will not be dependent upon the pilot for guidance. In Figs. 1 to 3, inclusive, of the drawings I have shown such means comprising a link 16 connected at its lower end by a universal joint 18 to the axle 8 and pivotally connected at its upper end to a crank 20 fixedly mounted upon a shaft 22 rockably mounted at its ends in bearings 24 secured to opposite sides of the yoke 2. The shaft 22 is actuated by a crank 25 fixedly mounted at one end upon said shaft and pivotally secured at its free end to a connecting rod 26 pivotally jointed at 28 and equipped at its rear end with a piston 30 reciprocably mounted in a cylinder 32 suitably secured to the chassis of the vehicle.

The cylinder 32 is connected to a reservoir 34 by means of a pipe 36 communicating with the forward end of the cylinder 32 which is also provided at its opposite end with a pipe 38. The reservoir 34 is supplied with a suitable motive fluid such, for instance, as compressed air, or a hydraulic fluid, through a pipe 39 having a check valve 40 which operates in a direction to permit the fluid to enter the reservoir 34. The supply pipe 39 is connected to a suitable source which is preferably under the control of the driver of the vehicle.

With the foregoing arrangement it is obvious that when the rear end of the piston 30 is subjected to greater pressure than its forward end, it will, through the intermediary of the intervening mechanism, hold the pilot wheels 6 in contact with the rails H with the desired pressure, and when the front end of said piston 30 is subjected to the greatest pressure it will effect the lifting of the pilot wheels 6 from the rails.

In the event that motive fluid may not always be available I have provided manually controlled means for raising the pilot wheels 6 from the track and securing them in raised position. Obviously such means might be made in different forms, but in the drawings I have shown one form comprising a crank 42 fixedly mounted at its rear end to the rock shaft 22 and pivotally connected at its forward end to the lower end of a screw 44 extending loosely through a boss 46 and threaded in the hub 48 of a hand wheel 50. The boss 46 is fixedly mounted upon an apron 52 secured at its forward end to the forward portion of the yoke 2 and at its rear end to the transverse reinforcing bar 4. When the vehicle is ready to run upon the track the hand wheel 50 is adjusted high enough upon the screw 44 to prevent the hub 48 from contacting with the boss when the wheels 6 move up or down due to irregularities in the track, but when the vehicle is ready to traverse a paved street or highway the wheel 50 is screwed downwardly to carry the hub 48 into contact with the boss 46, whereupon further rotation of said wheel 50 will cause the screw 44 to travel upwardly and lift the wheels 6 from the rails.

When the vehicle is traveling upon the track H it is important to have the conventional steering mechanism locked in straight ahead position so that when the flanged tires D are temporarily inactive as when raised from the track by the rubber tires E while running over a highway, railway crossing, or other surface on a level with said track, the vehicle will be guided in a straight course and cause said flanged wheels D to land truly upon the track when returning thereto. In the present instance I have shown a suitable locking mechanism for the above purpose consisting of a coupling pin 51 and a plate 53, which latter has a tapered hole for the reception of the tapered lower end of said coupling pin. The coupling pin 51 is movable in registering apertures in a pair of fixed jaws 55 and in an aperture in the upper end of a guide member 57 united to said jaws 55 by a transverse member 59 secured to the vehicle axle B by means of U-bolts 61.

The plate 53 is secured to the link G with caps 63, and said plate is of such width that when shifted to the right or left with said link G, during the operation of steering the vehicle, it will not pass from beneath the coupling pin 51. Hence, when the pin 51 is lowered to lock the plate 53 and the jaws 55 together it may ride upon said plate until the aperture therein registers with the apertures in the jaws 55. The pin 51 may be lifted from the aperture in the plate 53, to free the latter, by means of a cord 65 which may run over guide pulleys (not shown) to a point within convenient reach of the driver. A coil spring 67 is employed for preventing accidental uncoupling of the plate 53 and the jaws 55. The spring 67 encircles the pin 51 and is interposed between the upper portion of the guide member 57 and a collar 69, which latter is secured to the lower portion of the pin 51.

Figs. 5 to 7, inclusive, show a modified form in which the flanged tires D are dispensed with and the vehicle wheels with the rubber tires E' are arranged in alinement with the pilot wheels 6' in order to traverse the rails therewith. Said modified form also shows arms 10a consisting of rigid bars instead of the springs 10, and spring means 30a for holding the pilot wheels 6' in contact with the rails instead of the piston 30 and associated parts.

As the arms 10a comprise rigid bars instead of springs, in order to obtain the necessary flexibility to permit the pilot wheels 6' to accommodate themselves to irregularities in the track I swivel the forward ends of said arms 10a in bearings 60 secured to the pilot axle 8a and pivotally connect the rear ends of each arm to a clevis 62 bolted or otherwise rigidly secured to the vehicle axle B'.

The spring 30a is seated at its lower end upon a universal joint 18a and at its upper end against a cap 64 removably mounted upon a tubular member 66 loosely embracing the upper portion of said spring 30a. The tubular member 66 is vertically adjustable to compress the spring 30a, and in order that any compression within practical limits may be had I thread said member 66 in a boss 46a and provide it with a fixedly mounted hand wheel 50a whereby it may be rotated to cause it to move up or down in said boss 46a. After the desired adjustment of the tubular member 66 has been obtained it is secured from accidental movement by a lock nut 48a threaded thereon and adapted to be adjusted into engagement with the boss 46a, which latter is mounted upon an apron 52a secured at its ends to the yoke 2a and the brace 4a.

In order that the pilot wheels 6a may be raised and held from the rails when desired I provide a threaded rod 44a pivotally connected at its lower end to the universal joint 18a and provided at its upper threaded portion with a hand wheel 70 which may be screwed down upon the cap 64 and then rotated until the axle 8a has been raised firmly into contact with the lower end of the tubular member 66. As shown on Fig. 6, the rod 44a extends loosely through the spring 30a and a guide member 72 on the cap 64, so that when the wheel 70 is in raised position as shown said rod 44a will be free to move up and down with the pilot wheels 6a as they travel over irregularities in the track. A lock nut 74 is threaded upon the rod 44a for engagement with the wheel 70 to lock the same at any point of its adjustment. In other respects the construction of the modified form is substantially the same as the form disclosed by Figs. 1 to 3, inclusive, as is evidenced by corresponding reference numerals with exponents a.

In order to prevent independent lateral movement between the pilot wheels 6a and the vehicle wheels so that there will be no danger of the latter leaving the rails, the rear end of each arm 10a is fitted snugly between the jaws of the respective clevis 62 as shown by Fig. 5, so that while said arms 10a are free to swing in a vertical plane on pivots 76 they are held from lateral movement in a horizontal plane by the jaws of said clevis 62.

In some instances it may be desirable to locate the pilot means between the front and rear wheels of the vehicle.

From the foregoing description taken in connection with the drawings, it is apparent that I have provided pilot means for vehicles of the character described which are well adapted for the purpose intended, and while I have shown two forms of such pilot means, I reserve all rights to such other forms and modifications thereof as properly fall within the spirit and scope of the invention as claimed.

Having thus described my invention, what I claim and desire to secure by Letters Patent, is:

1. In combination, a vehicle having wheels adapted to traverse a railway track, pilot wheels alined with said vehicle wheels and adapted to coact with the track in guiding the vehicle, and resilient arms rigidly connected to the vehicle at one end and to said pilot means at the other end and adapted to permit independent vertical movement between the vehicle wheels and said pilot wheels without independent lateral movement between said wheels.

2. In combination, a vehicle having axles with wheels adapted to traverse a railway track, flanged pilot wheels alined with the vehicle wheels and adapted to traverse the track, an axle upon which said pilot wheels are mounted, and arms rigidly connected at their forward ends to said pilot axle and rigidly connected at their rear ends to the adjacent vehicle axle to prevent independent lateral movement in a horizontal plane between the vehicle wheels and the pilot wheels.

3. In combination, a vehicle having axles with wheels mounted thereon and adapted to traverse a track or a road, pilot wheels mounted upon an axle and adapted to traverse the track, resilient arms connected at one end to the pilot axle at the other end to the vehicle axles in a manner to prevent independent lateral movement in a horizontal plane between the vehicle wheels and the pilot wheels, said arms being capable of twisting longitudinally to permit either pilot wheel to move to a higher or lower plane than its companion so that both pilot wheels may accommodate themselves to irregularities in the track.

4. In combination, a vehicle having wheels with treads to traverse a highway and flanged treads to traverse a track, said flanged treads being of less diameter than said highway treads and arranged in axial alinement therewith, pilot means alined with said flanged treads and adapted to cooperate with the rails in guiding the vehicle wheels when the flanged treads are raised from the track by the highway treads running over a crossing, and arms rigidly connected at their rear ends to the vehicle and rigidly connected at their forward ends to said pilot means to prevent independent lateral movement in a horizontal plane between the vehicle wheels and the pilot means.

5. In combination, a vehicle having wheels adapted to traverse a railway track, a pilot having wheels adapted to traverse said track, means connecting the vehicle and pilot, a cylinder mounted on the vehicle, a piston reciprocably mounted in said cylinder and adapted to be actuated by a motive fluid, a connecting rod secured at its inner end to said piston, a rock shaft, crank members fixedly mounted upon said rock shaft and one of which is operably connected to the outer end of the connecting rod, a link operably connected at its upper end to one of the other crank members, and a universal joint connected to the lower end of said link and the pilot for raising or lowering the latter in accordance with the direction in which the piston travels.

6. In combination, a vehicle having wheels adapted to traverse a railway track or a highway, pilot means adapted to coact with the track in guiding said vehicle, a suitable number of resilient arms extending from the vehicle to said pilot means, means rigidly connecting the rear ends of said arms to the vehicle, and means rigidly connecting the forward ends of said arms to the pilot means.

7. In combination, a vehicle adapted to traverse a highway or a railway track, pilot means including an axle connected to the vehicle for rocking movement in a vertical plane and adapted to guide the vehicle when traversing the track, compressible means connecting said vehicle to the central portion of said pilot axle, said yielding means being adapted to transfer any desired proportion of the weight of the vehicle upon the central portion of said pilot means so that said pilot means bears substantially equally on both rails of said track.

8. In a combined road and rail vehicle, the combination of a vehicle axle, wheels journalled on said axle adapted to run on rails, a pilot axle having flanged wheels journaled thereon for engaging the rails, relatively stiff but flexible arms connecting said axles, the connections of said arms and axles being rigid so as to restrain independent lateral movement between said axles while permitting relative independent vertical movement therebetween, said arms being capable of longitudinal twisting so as to permit either pilot wheel to move to a higher or lower plane than its companion and means for transferring a portion of the vehicle load to the middle of said pilot axle whereby such transferred load is substantially equally divided between said pilot wheels at all times regardless of vertical movement of said pilot axles relative to said vehicle axle, said pilot axle and wheels being retractible from the rails by said load transferring means.

9. In a combined road and rail vehicle, the combination of a vehicle axle, wheels journalled on said axle adapted to run on rails, a pilot axle having flanged wheels journaled thereon for engaging the rails, relatively stiff but flexible arms connecting said axles, the connections of said arms and axles being rigid so as to restrain independent lateral movement between said axles while permitting relative independent vertical movement therebetween, said arms being capable of longitudinal twisting so as to permit either pilot wheel to move to a higher or lower plane than its companion and compressible means for transferring a portion of the vehicle load to the middle of said pilot axle whereby such transferred load is substantially equally divided between said pilot wheels at all times regardless of vertical movement of said pilot axles relative to said vehicle axle, said pilot axle and wheels being retractible from the rails by said load transferring means.

10. In a combined road and rail vehicle, the combination of a vehicle axle, wheels journaled on said axle adapted to run on rails, a pilot axle having flanged wheels journaled thereon for engaging the rails, relatively stiff but flexible arms connecting said axles, the connections of said arms and axles being rigid so as to restrain independent lateral movement between said axles while permitting relative independent vertical movement therebetween, said arms being capable of longitudinal twisting so as to permit either pilot wheel to move to a higher or lower plane than its companion and variably compressible means for transferring a portion of the vehicle load to the middle of said pilot axle whereby such transferred load is substantially equally divided between said pilot wheels at all times regardless of vertical movement of said pilot axles relative to said vehicle axle, said pilot axle and wheels being retractible from the rails by said load transferring means.

11. In a combined road and rail vehicle, the combination of a vehicle axle, wheels journaled on said axle adapted to run on rails, a pilot axle having flanged wheels journaled thereon for engaging the rails, relatively stiff but flexible arms connecting said axles, the connections of said arms and axles being rigid so as to restrain independent lateral movement between said axles while permitting relative independent vertical movement therebetween, said arms being capable of longitudinal twisting so as to permit either pilot wheel to move to a higher or lower plane than its companion and fluid pressure means for transferring a portion of the vehicle load to the middle of said pilot axle whereby such transferred load is substantially equally divided between said pilot wheels at all times regardless of vertical movement of said pilot axles relative to said vehicle axle, said pilot axle and wheels being retractible from the rails by said load transferring means.

12. In combination, a vehicle adapted to traverse a highway or a railway track, pilot means including an axle and adapted to guide the vehicle when traversing the track, means connecting the pilot means to the vehicle and permitting rocking movement of the axle in a plane transversely of the track, and means for transferring a portion of the vehicle load to the pilot means through a connection disposed substantially on the longitudinal center line of the vehicle.

13. In combination, a vehicle adapted to traverse a highway or a railway track, pilot means including an axle and adapted to guide the vehicle when traversing the track, means connecting the pilot means to the vehicle and permitting rocking movement of the axle in a vertical plane, and means for transferring a portion of the vehicle load to the pilot means through a connection disposed substantially on the longitudinal center line of the vehicle, the load transferring means being operative to retract the pilot means from the railway track.

14. In a combined road and rail vehicle, the combination of a vehicle axle having wheels adapted to run on rails, a pilot axle having flanged wheels journaled thereon for engaging the rails, means connecting said axles and permitting relative vertical movement of the axles, said means also permitting either pilot wheel to move to a higher or lower plane than its companion, and means for transferring a portion of the vehicle load to the pilot axle through a connection disposed substantially on the longitudinal center line of the vehicle.

15. In a combined road and rail vehicle, the combination of a vehicle axle having wheels adapted to run on rails, a pilot axle having flanged wheels journaled thereon for engaging the rails, means connecting said axles to restrain independent lateral movement between the axles while permitting relative vertical movement of the axles, said means also permitting either pilot wheel to move to a higher or lower plane than its companion, and means for transferring a portion of the vehicle load to the pilot axle through a connection disposed substantially on the longitudinal center line of the vehicle.

16. In a combined road and rail vehicle, a vehicle supporting axle, wheels on said axle, a pilot axle, means interconnecting said pilot axle and said supporting axle permitting relative vertical rocking and twisting movement between said axles while restraining relative movement between them in the direction of their length, flanged wheels on said pilot axle, means including a connection between the pilot axle and the vehicle located substantially on the longitudinal center line of the vehicle and permitting said rocking and twisting movement, the last-named means being operable for transferring a portion of the weight of the vehicle to said pilot axle and for raising and lowering said pilot axle with respect to said supporting axle.

17. In combination, a vehicle adapted to traverse a highway or a railway track, pilot means including an axle and adapted to guide the vehicle when traversing the track, means connecting the pilot means to the vehicle and permitting rocking movement of the axle in a plane transversely of the track, and means including an extension frame rigid with the vehicle and projecting beyond an end thereof for transferring a portion of the vehicle load to the pilot means through a connection disposed substantially on the longitudinal center line of the vehicle.

18. In combination, a vehicle adapted to traverse a highway or a railway track and having axles with wheels mounted thereon, pilot means adapted to guide the vehicle when traversing the track and including an axle having flanged pilot wheels mounted thereon, means connecting the pilot axle with the adjacent vehicle axle and permitting vertical movement of the pilot axle relative to the vehicle axle while restraining independent lateral movement between said pilot axle and said adjacent vehicle axle, and means operating directly between the vehicle and the pilot axle for transferring a portion of the vehicle load to the pilot means through a connection disposed substantially on the longitudinal center line of the vehicle.

DAVID W. MAIN.